Jan. 25, 1944.                J. Q. STEWART                 2,340,153
                             PERPETUAL CALENDAR
                             Filed Oct. 15, 1941              3 Sheets-Sheet 1

Fig. 1a

*(109)* JANUARY

*(109')* JANUARY — LEAP YEARS ONLY

*(110)* FEBRUARY

*(110')* FEBRUARY — LEAP YEARS ONLY

*(111)* MARCH

*(112)* APRIL

*(113)* MAY

*(114)* JUNE

*(115)* JULY

*(116)* AUGUST

*(117)* SEPTEMBER

*(118)* OCTOBER

*(119)* NOVEMBER

*(120)* DECEMBER

INVENTOR
JOHN Q. STEWART
BY Frank S. Misterly
ATTORNEY

Jan. 25, 1944. J. Q. STEWART 2,340,153
PERPETUAL CALENDAR
Filed Oct. 15, 1941 3 Sheets-Sheet 2

INVENTOR
JOHN Q. STEWART
BY Frank S. Ullistery
ATTORNEY

Jan. 25, 1944. J. Q. STEWART 2,340,153
PERPETUAL CALENDAR
Filed Oct. 15, 1941 3 Sheets-Sheet 3

INVENTOR
JOHN Q. STEWART
BY Frank S. Misterly
ATTORNEY

Patented Jan. 25, 1944

2,340,153

UNITED STATES PATENT OFFICE 2,340,153

PERPETUAL CALENDAR

John Q. Stewart, Princeton, N. J.

Application October 15, 1941, Serial No. 414,989

3 Claims. (Cl. 40—107)

The present invention relates generally to calendars and more particularly to improvements in perpetual calendars.

The principal object of my invention is to provide a calender which in its pattern of association of the days of the week with the days of a month presents the appearance of an ordinary simple familiar calendar, whether showing a single month of the current year or a sequence of months; and which, unlike the ordinary calendars in common use, does not expire at the end of a year or other period but, without recourse to any data not a part of the various scales of the apparatus itself, expeditiously can be set month after month, year after year, never becoming obsolete.

Another object, implicit in the accomplishment of the first, is to provide a perpetual calendar similar in appearance to any ordinary calendar which readily can be set for any month in the near or far past or future, thus determining the day of the week corresponding to any date, whether New Style or Gregorian (our common reckoning), or Old Style or Julian. Although various numerical tables and mechanical devices already exist for finding the day of the week corresponding to any date, the method of operation of my device is of particular ease, and since the scales when set have the familiar appearance of an ordinary calendar this device vividly presents to unskilled users the whole chronological environment of the required date.

A further object is to attain the objects already mentioned by means simple and cheap yet elegant and compact. That previous devices have not succeeded in this is indicated by their failure to displace from common use any appreciable number of the ordinary calendars, notwithstanding the drawback of early obsolescence which these have. The various types of continuing calendars frequently found on the market are not to be confused with a true perpetual calendar, since they do not include within their own scales all the data which the user requires to set them correctly. My device is particularly advantageous in its economy of space, because the ratio in area of the effective face of the calendar proper to the supplementary scales is relatively large.

With the above objects in view, the invention consists of certain novel features, as hereinafter shown and described and then specifically pointed out in the claims.

In the accompanying drawings:

Figures 1a and 1b taken together illustrate the invention embodied in the form of a plurality of year-cards and month cards;

Figure 3 illustrates a sample month card of another embodiment wherein the current month is shown with the next preceding month and the next succeeding month;

Figure 4 shows a sample year card arranged to cooperate with the type of month cards shown in Figure 3; and Figure 5 illustrates the manner in which a year card such as shown in Figure 4 cooperates with a month-card such as shown in Figure 3 to produce a familiar calendar pattern showing the current or desired month, the previous month, and the following month.

The invention will be clarified if the relevant chronological theory is recalled. The succession of days of the week is in a regular cycle of seven, while the succession of calendar dates—involving the century, the year in the century, the month in the year, and the day of the month—is given by certain arithmetical rules. With every day of the year, beginning every year with January 1, a letter can be associated, A, B, C, D, E, F, or G, repeating for consecutive days in cyclical order, so that January 8 is always A again, January 9 is B and so on. Only February 29, when it occurs, has no letter. Consequently, in a non-leap-year all the Sundays have the same letter, and this letter is called the "dominical letter" or "Sunday letter" of the year. The day of the week corresponding to any given date, whether Gregorian or Julian, can be computed by adding four integers, each no greater than seven, and taking the remainder, after the integral sevens have been removed from the said sum, to designate the day of the week: as 1 for Sunday, 2 for Monday . . . 7 for Saturday.

I shall call four such integers the "characteristic integers." One of them is a function of the century year, differing in old and new styles. Another is a function of the year in the century. Another is a function of the month, but for January and February is changed by unity in leap-years from its ordinary values (unless, as is sometimes done, the leap-year difference is put on the characteristic integer for the year, this being then considered changed by unity during January and February of a leap-year as compared with its value during the remainder of the same year). The other integer is merely the day-number in the month, or this number after the integral sevens have been removed, as 3 for the 17th of the month. The dominical letter for a given year corresponds to the sum of the characteristic integers for the century and the year in the century.

With this arithmetical situation it is clear that any mechanical method of designating the four characteristic integers and adding them—as step by step by a succession of sliders—will determine the day of the week corresponding to a given date. While a variety of devices for the purpose have been described, some of them many years ago, none of them has all the advantages of compactness combined in my device with the elimination of mental operations and the preservation in all settings of the exact form of the ordinary calendar.

Figure 1B:
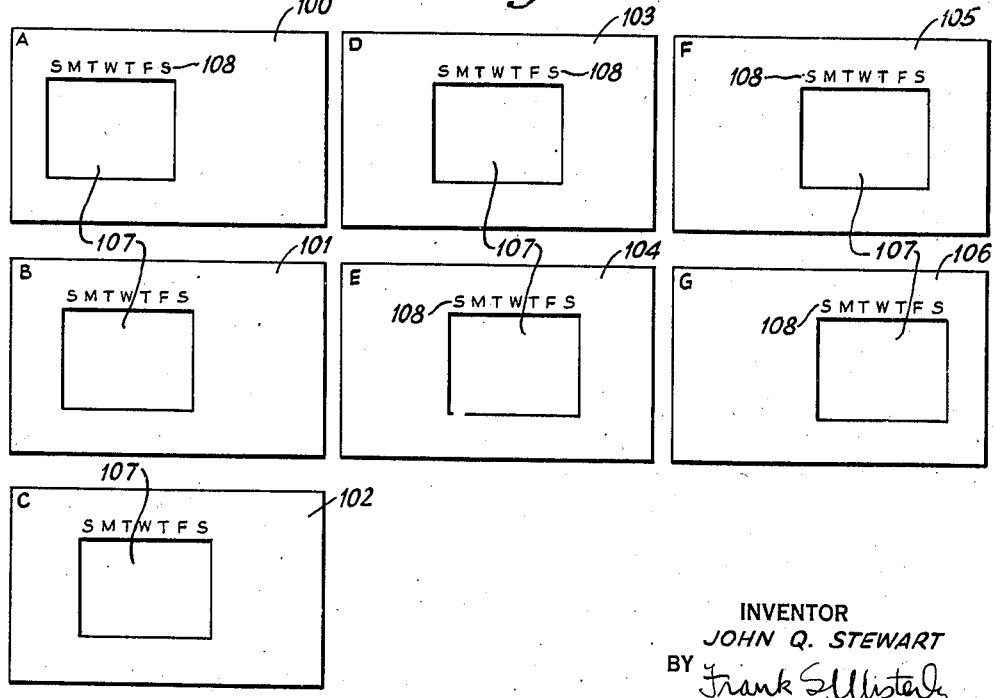

Referring particularly to Figures 1a and 1b of the drawings, it will be noted that a calendar incorporating the features of my invention may be made in the form of a plurality of cards; more particularly, twenty-one cards, seven of which, 100–106 inclusive, are year-cards which will be referred to herein as masks, and fourteen of which, 109, 109', 110, 110' and 111–120 inclusive, are month cards. The group of month-cards 109, 110 and 111–120 inclusive represent the twelve months of any year other than leap years while the group of cards 109', 110' and 111–120 inclusive represent in this particular embodiment, the twelve months of any leap year.

Each of the month cards is provided with thirteen columns and six (December has seven) rows of day numbers, the order of numbers, including blanks, being different on each card, but the spacings being the same. Thus, month card 109 which is the card for January of all years except leap years, has no day numbers in the first row positions of the first seven columns, however, the first row positions of the last six columns are numbered 1 through 6 respectively. The second row positions of the thirteen columns are numbered 1 through 13 respectively. The third positions are numbered 8 through 20 respectively and the fourth row positions are numbered 15 through 27 respectively. The fifth row positions of the first ten columns are numbered 22 through 31 respectively and the sixth row positions of the first three columns are numbered 29, 30 and 31 respectively.

The manner in which the columns of each of the other month cards are marked is believed to be apparent from the drawings.

Each one of the year masks 100–106 inclusive is provided with an opening 107 which is preferably rectangular in shape. The openings 107 are preferably of the same size in all the masks being indeed just large enough to expose all the rows of any successive seven of the thirteen columns or positions of day numbers marked on the month cards hereinbefore described.

The opening of each successive year card is staggered by the width of one column of the month cards; thus, opening 107 of year card 100 if the year card is placed properly over any one of the month cards will expose all of the rows of the first seven columns of day numbers; the opening 107 of year card 101 will expose the second, third, fourth, fifth, sixth, seventh, and eighth columns; the opening 107 of year card 102 will expose the third through the ninth columns; the opening 107 of year card 103 will expose the fourth through the tenth columns; opening 107 of year card 104 will expose the fifth through the eleventh columns; opening 107 of year card 105 will expose the sixth through the twelfth columns; and, opening 107 of year card 106 will expose the seventh through the thirteenth columns.

Each mask carries a scale 108 of days of the week in the normal order immediately adjacent one side of its opening 107. Each scale may comprise the first letter of each day of the week; namely, S, M, T, W, T, F, S and the letters are arranged so that the first letter registers with the first exposed column of its year card, the second letter registers with the second exposed column and so on. Instead of single letter abbreviations, longer abbreviations or the full names of the days of the week may be used in similar registration with the exposed columns.

It is preferable to mark each month card with the name of the month it represents and to arrange such marking so that the name of the month will be exposed through the opening of any one of the year masks.

In order to simplify placing a year card on a month card in correct registration, it is preferable to make all of the cards of the same size. In this way when any year card is placed face up exactly over any one of the month cards seven columns of day numbers will be exposed through the year card window 107, said exposed seven columns being designated by the seven days of the week marked on the mask while the unwanted six columns of day numbers are hidden.

Each of the masks can be marked with the years for which it represents the correct setting, in other words, the correct designations of days of the month as days of the week. Since the Gregorian calendar repeats identically every 400 years, 2000 A. D. having the same calendar as 1600 A. D., 2001 as 1601, etc., it suffices for the Gregorian calendar to indicate only a consecutive series of 400 years.

Below are shown the years appropriate for each year mask from 1600 A. D. to 2000 A. D. inclusive in the Gregorian system. The appropriate year markings for each year card may be printed on the front and/or back of the card.

Each mask corresponds to all years which have a certain one of the seven dominical letters, and the proper letter can be marked on each year mask. This marking has been shown in Figure 1b on the left hand top corner of each year mask. The following table covers the years which are appropriate for each year mask.

*Years appropriate for year masks*

[Leap years are underlined]

| | | | | | | | | |
|---|---|---|---|---|---|---|---|---|
| (A) Year mask 100 | 1600 | 1606 | 1617 | 1623 | 1628 | 1634 | 1645 | |
| | 1651 | 1656 | 1662 | 1673 | 1679 | 1684 | 1690 | |
| | 1702 | 1713 | 1719 | 1724 | 1730 | 1741 | 1747 | |
| | 1752 | 1758 | 1769 | 1775 | 1780 | 1786 | 1797 | |
| | 1809 | 1815 | 1820 | 1826 | 1837 | 1843 | 1848 | |
| | 1854 | 1865 | 1871 | 1876 | 1882 | 1893 | 1899 | |
| | 1905 | 1911 | 1916 | 1922 | 1933 | 1939 | 1944 | |
| | 1950 | 1961 | 1967 | 1972 | 1978 | 1989 | 1995 | 2000 |
| (B) Year mask 101 | 1605 | 1611 | 1616 | 1622 | 1633 | 1639 | 1644 | |
| | 1650 | 1661 | 1667 | 1672 | 1678 | 1689 | 1695 | |
| | 1701 | 1707 | 1712 | 1718 | 1729 | 1735 | 1740 | 1746 |
| | 1757 | 1763 | 1768 | 1774 | 1785 | 1791 | 1796 | |
| | 1803 | 1808 | 1814 | 1825 | 1831 | 1836 | 1842 | 1853 |
| | 1859 | 1864 | 1870 | 1881 | 1887 | 1892 | 1898 | |
| | 1904 | 1910 | 1921 | 1927 | 1932 | 1938 | 1949 | |
| | 1955 | 1960 | 1966 | 1977 | 1983 | 1988 | 1994 | |
| (C) Year mask 102 | 1604 | 1610 | 1621 | 1627 | 1632 | 1638 | 1649 | |
| | 1655 | 1660 | 1666 | 1677 | 1683 | 1688 | 1694 | |
| | 1700 | 1706 | 1717 | 1723 | 1728 | 1734 | 1745 | |
| | 1751 | 1756 | 1762 | 1773 | 1779 | 1784 | 1790 | |
| | 1802 | 1813 | 1819 | 1824 | 1830 | 1841 | 1847 | |
| | 1852 | 1858 | 1869 | 1875 | 1880 | 1886 | 1897 | |
| | 1909 | 1915 | 1920 | 1926 | 1937 | 1943 | 1948 | |
| | 1954 | 1965 | 1971 | 1976 | 1982 | 1993 | 1999 | |
| (D) Year mask 103 | 1609 | 1615 | 1620 | 1626 | 1637 | 1643 | 1648 | |
| | 1654 | 1665 | 1671 | 1676 | 1682 | 1693 | 1699 | |
| | 1705 | 1711 | 1716 | 1722 | 1733 | 1739 | 1744 | |
| | 1750 | 1761 | 1767 | 1772 | 1778 | 1789 | 1795 | |
| | 1801 | 1807 | 1812 | 1818 | 1829 | 1835 | 1840 | 1846 |
| | 1857 | 1863 | 1868 | 1874 | 1885 | 1891 | 1896 | |
| | 1903 | 1908 | 1914 | 1925 | 1931 | 1936 | 1942 | 1953 |
| | 1959 | 1964 | 1970 | 1981 | 1987 | 1992 | 1998 | |
| (E) Year mask 104 | 1603 | 1608 | 1614 | 1625 | 1631 | 1636 | 1642 | 1653 |
| | 1659 | 1664 | 1670 | 1681 | 1687 | 1692 | 1698 | |
| | 1704 | 1710 | 1721 | 1727 | 1732 | 1738 | 1749 | |
| | 1755 | 1760 | 1766 | 1777 | 1783 | 1788 | 1794 | |
| | 1800 | 1806 | 1817 | 1823 | 1828 | 1834 | 1845 | |
| | 1851 | 1856 | 1862 | 1873 | 1879 | 1884 | 1890 | |
| | 1902 | 1913 | 1919 | 1924 | 1930 | 1941 | 1947 | |
| | 1952 | 1958 | 1969 | 1975 | 1980 | 1986 | 1997 | |
| (F) Year mask 105 | 1602 | 1613 | 1619 | 1624 | 1630 | 1641 | 1647 | |
| | 1652 | 1658 | 1669 | 1675 | 1680 | 1686 | 1697 | |
| | 1709 | 1715 | 1720 | 1726 | 1737 | 1743 | 1748 | |
| | 1754 | 1765 | 1771 | 1776 | 1782 | 1793 | 1799 | |
| | 1805 | 1811 | 1816 | 1822 | 1833 | 1839 | 1844 | |
| | 1850 | 1861 | 1867 | 1872 | 1878 | 1889 | 1895 | |
| | 1901 | 1907 | 1912 | 1918 | 1929 | 1935 | 1940 | 1946 |
| | 1957 | 1963 | 1968 | 1974 | 1985 | 1996 | 1991 | |
| (G) Year mask 106 | 1601 | 1607 | 1612 | 1618 | 1629 | 1635 | 1640 | 1646 |
| | 1657 | 1663 | 1668 | 1674 | 1685 | 1691 | 1696 | |
| | 1703 | 1708 | 1714 | 1725 | 1731 | 1736 | 1742 | 1753 |
| | 1759 | 1764 | 1770 | 1781 | 1787 | 1792 | 1798 | |
| | 1804 | 1810 | 1821 | 1827 | 1832 | 1838 | 1849 | |
| | 1855 | 1860 | 1866 | 1877 | 1883 | 1888 | 1894 | |
| | 1900 | 1906 | 1917 | 1923 | 1928 | 1934 | 1945 | |
| | 1951 | 1956 | 1962 | 1973 | 1979 | 1984 | 1990 | |

From the above it will be noted that in the embodiment shown in Figures 1a and 1b, the whole arrangement reduces to a pack of specially constructed cards, there being fourteen month cards, and seven year cards, all of the same size if so desired. When the proper year card is placed exactly over the proper month card, the opening in the year card exposes the correct number of days for that month and year, in sequence, and having their correct designation as days of the week—the visible effect being exactly that of the ordinary calendar.

The size of the resulting perpetual calendar is not greatly increased as compared with an ordinary calendar having the same size printing or marking, and this is a special advantage of this embodiment.

Figure 2:
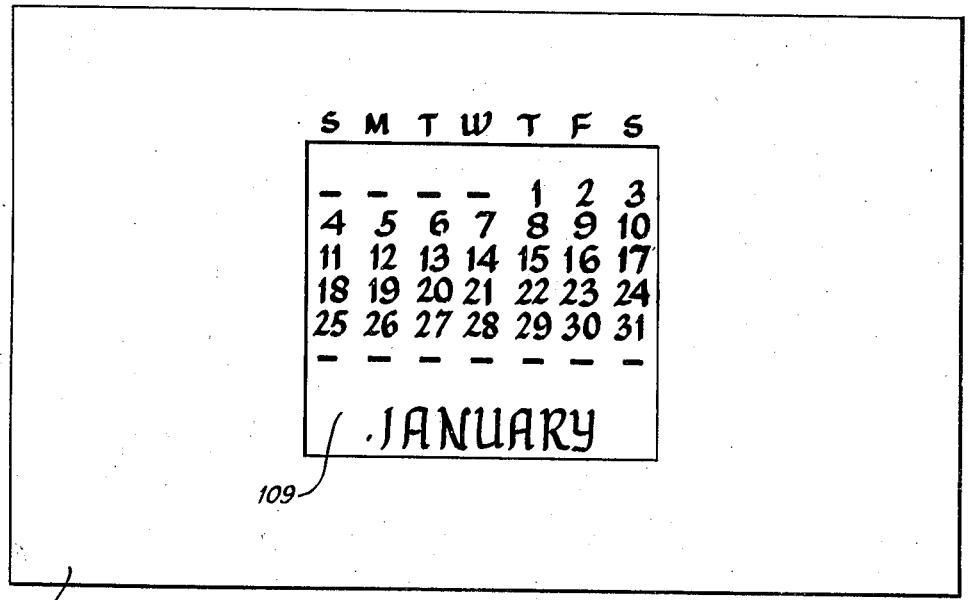
Figure 2 illustrates the manner in which one of the year-cards shown in Figure 1b cooperates with one of the month-cards shown in Figure 1a to produce a familiar calendar pattern.

Figure 2 shows the way the calendar appears when the year card or mask 103 which is good for the years noted in the fourth group of the above table is placed over the month card 109 which is good for the month of January of all those years except leap years.

It is believed that a detailed description of the second embodiment of the invention shown in Figures 3, 4, and 5 is not necessary to an understanding thereof; it being only necessary to state that each one of the seven year masks, only one of which is shown at 121 in Figure 4, is provided with three openings 122, 123, and 124 representing a month, the preceding month, and the succeeding month, respectively; and that each of the month cards 125 only one of which is shown in Figure 3, is provided with three day number charts 126, 127, and 128 representing the day numbers for one of the months and the day numbers for the preceding month and the succeeding month respectively. Obviously more than three months may be exposed if desired.

Because of the overlaps from December through March there are four special month cards for leap-years, or sixteen month cards in all in the embodiment illustrated.

In Figure 5 there is shown the appearance of a calendar using the type of year masks and month cards shown in Figures 3 and 4. The exact arrangement is, of course, not significant; instead of showing the current month in larger type, a series of consecutive months printed in the same sized type and immediately adjacent each to each could be shown simultaneously through a large opening in a mask appropriate for the year.

It is to be understood that none of the embodiments of the invention described are confined to the system of chronological reckoning which provides only one characteristic integer or dominical letter for a leap year while providing special alternate characteristic integers for January and February in leap years. With equal mechanical ease the system of a special integer for the first two months of a leap year and another for the remaining ten can be used, with January and February always appearing with the same integer. Such a system permits reduction of the number of month scales from fourteen to twelve, but requires a double marking of the year cards as respects leap years.

The number of month scales can be further reduced—to seven—if certain month scales are marked with the names of additional months according to the following scheme—Referring to Figure 1a, let the card for January (common years) be marked also October; let January (leap years) be marked also April and July; let February (common years) be marked also March and November; let February (leap years) be marked also August; let May be marked May only; June, June only; let September be marked also December; and omit the cards marked in Figure 1a, March, April, July, August, October, November, and December. This arrangement has, however, the disadvantage that day numbers 1-31 inclusive are exposed for every month.

Of course, a reduction in the number of month cards—but not in the number of scales—can be made by the obvious expedient of printing scales on both sides of the cards. Furthermore, the mask appropriate for years of dominical letter A, if reversed, is suitable for the G years; mask B reversed for F years; mask C reversed for E years—which device of turning the masks upside down reduces the required number to four. Only one mask indeed is absolutely essential, if it be usable in seven different positions so as to make its opening expose any required consecutive seven columns of day numbers on the month scales.

And again the role of the masks and the cards can be interchanged without the loss of all the advantages of my invention—the masks being marked in the appropriate order, respectively, with the combinations of months enumerated in the preceding paragraph, for example; and each card carrying a scale of day numbers as already described marked not with a month or months but instead with the years for which it is appropriate in combination with the masks with markings thus altered.

Furthermore, devices of this same general character could be used, with appropriate changes, for any calendar that might be devised at all along the lines of the present Gregorian calendar. Say one with seventeen months of widely varying lengths and an altered rule for leap years.

It should be understood also that for Julian dates the years would fall into different sets, as compared with the Gregorian sets already enumerated. The Julian sets of years likewise can be marked on the appropriate year masks, or indicated in a formula or table or correspondences.

The number of patterns of each of the month cards shown in Figure 1a can be altered together in the following manner without essential difference; strike out the right-hand or thirteenth column of day numbers, and substitute at the extreme left a new column of day numbers having numbers less by unity than the present first column of the respective month. For example, January (Figure 1a) for common years when so altered becomes:

```
                       1  2  3  4  5
    1  2  3  4  5  6  7  8  9 10 11 12
 7  8  9 10 11 12 13 14 15 16 17 18 19
14 15 16 17 18 19 20 21 22 23 24 25 26
21 22 23 24 25 26 27 28 29 30 31 -- --
28 29 30 31 -- -- -- -- -- -- -- --
``` which thus agrees in all respects with the card marked May in Figure 1a. This process can be repeated as many times as desired, provided all the month cards are changed together, and provided the cooperating change is made in the markings of the year masks; i. e., with the pattern for January shown just above mask 100 (Figure 1a) must be lettered G instead of A, and the years of its appropriate use are changed to correspond; mask 101 must be lettered A instead of B; and so on, mask 106 being lettered F instead of G.

What I claim is:

1. In a perpetual calendar, a plurality of members bearing scales of "days of the month," each scale being appropriate for a particular month and comprising at least thirteen positions of day-numbers, a plurality of masking members cooperating with said scales each of said masking members being marked in a different position with a scale of "days of the week" and having an aperture adjacent to said scale for exposing seven successive positions of said day-numbers, the seven markings of each of said scales of "days of the week" registering respectively with the exposed seven successive positions of day-numbers, said thirteen positions of day-numbers being so patterned that any seven successive positions include all the day-numbers of the respective month and no other numbers and that successive day-numbers in a single column differ by seven: the relation to each other of the number-patterns for individual months being such that if any particular position in one scale be designated as Sunday, the next one in order Monday, and so on through Saturday, then if these same designations are applied to the corresponding positions in certain others of the plurality of scales, the indications which result of the days of the week of all the months so treated will be correct in years which have a certain dominical letter.

2. In a perpetual calendar, a series of seven equi-sized templates, one for each dominical letter, each marked at seven equally-spaced positions with the days of the week, in order Sunday, Monday, Tuesday, Wednesday, Thursday, Friday, Saturday, without repetition, said scale of "days of the week" on each template being adjacent to a window which is the same size on all the templates but differently placed in accordance with the dominical letter of the year for which the template is appropriate; and a series of at least 14 cards, each marked at thirteen equally-spaced positions or columns with a scale of "days of the month," the interval between successive positions being the same as between the positions of the days of the week on the templates: the size and positions on the template of the window being such that each template when placed in a standard manner above any card hides six of the thirteen columns of day-numbers and exposes seven consecutive columns thereof: the position of the window from template to template in the series being different by the constant interval between columns, so that each of the seven templates exposes a different combination of seven columns, but the same combination on every card, hiding all other columns on all the cards.

3. In a perpetual calendar, a series of seven substantially equi-sized templates, one for each dominical letter, a window formed in each template, each template being marked adjacent its window with "days of the week" indicia, in order Sunday, Monday, Tuesday, Wednesday, Thursday, Friday and Saturday without repetition, all of said windows being of substantially the same size but differently positioned on said templates in accordance with the dominical letter of the year for which the template is apropriate; and a series of fourteen cards, there being an individual card for each of the months of March, April, May, June, July, August, September, October, November and December adapted for use in any year, an individual card for each of the months of January and February adapted for use in leap years only and an individual card for each of the months of January and February adapted for use in common years only, each of said fourteen cards being marked at thirteen equally spaced columns with "days of the month" indicia, the interval between successive positions of said columns being the same as the interval between the successive positions of the "days of the week" indicia on the templates, the size and position of the window on each template being such that each template when placed in a standard manner above any one of said cards hides six of the thirteen columns of day numbers and exposes seven consecutive columns thereof, the position of the window from template to template in the series being different by the constant interval between columns, so that each of the seven templates exposes a different combination of seven columns, but the same combination on every card.

JOHN Q. STEWART.